United States Patent [19]  [11]  4,234,430
Peer et al.  [45]  Nov. 18, 1980

[54] FILTERING SEPTUM

[75] Inventors: George J. Peer, Mt. Kisco, N.Y.; Robert C. Bradley, Paramus, N.J.

[73] Assignee: Multi-Metal Wire Cloth Inc., Tappan, N.Y.

[21] Appl. No.: 16,420

[22] Filed: Mar. 1, 1979

[51] Int. Cl.² ............................................. B01D 25/18
[52] U.S. Cl. .................................... 210/489; 210/498
[58] Field of Search ............... 210/483, 486, 488, 489, 210/492, 498, 455, 510, 355, 336, 446

[56] References Cited
U.S. PATENT DOCUMENTS 1,639,133  8/1927  Greene ................................... 210/498
2,269,031  1/1942  MacArthur ........................ 210/446
3,052,360  9/1962  Imershein ............................. 210/489

Primary Examiner—Frank Sever
Attorney, Agent, or Firm—Pennie & Edmonds

[57] ABSTRACT

An improved filtering septum for a restricted flow of liquid for filtration and liquid clarification having a pair of metal sheets each having an array of closely spaced small diameter perforations punched therethrough so as to form burrs on the inner face of each of the sheets at the periphery of the perforations, secured in face-to-face relation with the perforations of one sheet completely out of registry with those of the other such that the burrs of each sheet bear against unperforated areas of the other sheet along lines of imperfect contact pervious to a restricted flow of liquid.

5 Claims, 7 Drawing Figures

FILTERING SEPTUM

TECHNICAL FIELD

This invention relates to improvements in a filtering septum and method of manufacturing same; and, in particular, a filtering septum of the type which utilizes the principle of edge filtration.

BACKGROUND ART

Filtering septums are used in a variety of industrial filtration processes and it is particularly well adapted for filtration in a pressurized vessel for treatment of waste water and the like. In pressure vessel work the septum divides a container into two compartments. A fluid contaminated with solid particles is directed into one of the compartments which is filled with a highly porous substance that absorbs or separates the solid particles from the fluid. As an example, the absorption medium which filters the fluid is activated charcoal. The filtering septum permits the passage of the filtered liquid, the filtrate, but its holes are sufficiently small to retain the activated charcoal.

An edge-filtering septum is taught by U.S. Pat. No. 3,052,360 to Imershein which consists of a pair of superposed secured sheets of metal each of which is provided with a multiplicity of punched holes arranged in a definite spatial pattern in order that the sheets may be so relatively positioned that none of the holes in one sheet is in registry with any of the holes in the other sheet. The medium being filtered is not permitted to flow directly through the septum. Rather, after flowing through the holes in one sheet, it must flow edgewise between the sheets to reach the holes in the other sheet. Hence, the term "edge" filtration.

The Imershein patent solved two major problems in the manufacture of edge filtering septums. The first problem was the unpredictable stretching of, and other dimensional deviations in, a metal sheet when it is subjected to the manufacturing operation which creates the multiplicity of holes therein. It was previously virtually impossible to position two such sheets, in superposed relation, so that all the holes of one would be out of registry with all the holes of the other. This problem was especially acute since the diameters of the holes involved are only a few thousandths of an inch, and the center-to-center distances between adjacent holes is of the order of one-tenth of an inch. Therefore, in a sheet 8 feet long (for example) and two feet wide, over 200,000 such holes are present. Obviously, in such circumstances even a slight difference between the amounts of dimensional deviation caused in the two sheets by the hole-forming operation might render it impossible to so arrange the sheets that all the holes of one coincide only with the unperforated areas of the other. If there is any alignment at all between any holes in the respective sheets, the edge filtering effect can be seriously affected.

The second problem arose from the fact that the liquid being filtered passes edgewise between the sheets, and hence variations in spacing between the sheets creates variations in filtering results. If it is attempted to overcome this problem by pressing the sheets together more tightly, no space at all might remain to accommodate the flow. If, on the other hand, the pressure holding the sheets together is reduced, variable spacing and consequent non-uniform flow through action might be permitted. Any appreciable increase in the spacing between the sheets, of course, cancels the advantages of edge filtration.

In the prior art septum the punching operation resulted in the formation of a rough edge commonly referred to as a "burr" on the inner face of the top sheet about the periphery of each hole. These burrs bear against unperforated areas in the lower sheet after the sheets are shifted to bring the holes out of registry and generally define the distance between the two sheets.

The prior art septum offers significant improvements since it is able to more effectively retain the medium that performs the filtration than screen and cloth type filters of comparable hole size, because of the "edge-filtration" effect. However, it has been observed that under increased pressure, the prior art septum will exhibit a tendency to permit a greater passage of liquid through its central regions than throughout the peripheral portions. This uneven flow distribution is known as "channeling". While channeling does not necessarily affect the quality of the filtration, it will cut down the efficiency of the process because the activated charcoal will not be utilized uniformly. Hence, the activated charcoal will have to be replaced faster than it might otherwise.

DISCLOSURE OF THE INVENTION

Applicants have discovered that a filtering septum comprising two perforated metal sheets each of which is formed with marginal burrs on one face thereof when secured in face-to-face relation result in significant improvements. In particular, the present filtering septum provides more resistance to the filtrate flowing therethrough resulting in a greater pressure differential than achieved previously for the same diameter perforations. The greater pressure differential, in turn, produces a highly uniform flow distribution and hence more efficient and economical filtration process. This results from a high utilization of the filtering substance, e.g., activated charcoal.

In a preferred embodiment, the improved filtering septum is of the type that includes a pair of metal sheets in superposed contacting relation, each sheet having a multiplicity of perforations therein. The perforations in each of the sheets being of like generally uniform diameter and arranged in the same spatial pattern. The pattern is such that adjacent to each perforation there is an unperforated area larger than said perforation. The superposed sheets are arranged in a relationship in which the perforations of one sheet are completely out of registry with those of the other sheet.

In the present improvement both of the metal sheets comprise marginal burrs on the inner face of each of the sheets defined by the perforations such that when the two sheets are secured in inner-face-to-inner-face relationship, the burrs of each of the sheets bear against unperforated areas of the other sheet along lines of imperfect contact pervious to a restricted flow of liquid.

The present invention also includes a method of making a filtering septum. A preferred method of making a filtering septum comprises temporarily securing a first metal sheet in superposed contacting relation to a bottom sheet, perforating at least the first metal sheet and thereby forming marginal burrs on its inner face defined by the perforations, and disconnecting the first metal sheet from the bottom sheet.

The preferred method further comprises repeating the above steps with a second metal sheet substituted for the first metal sheet. Subsequently, the first and second perforated sheets are placed in inner-face-to-inner face relationship so that the burrs of each sheet face inward and the perforations in one sheet are completely out of registry with those in the other. The sheets are secured together in this relationship such that the burrs of either sheet bear against unperforated areas of the other sheet along lines of imperfect contact pervious to a restricted flow of liquid.

BEST MODE FOR CARRYING OUT THE INVENTION

Figure 1:
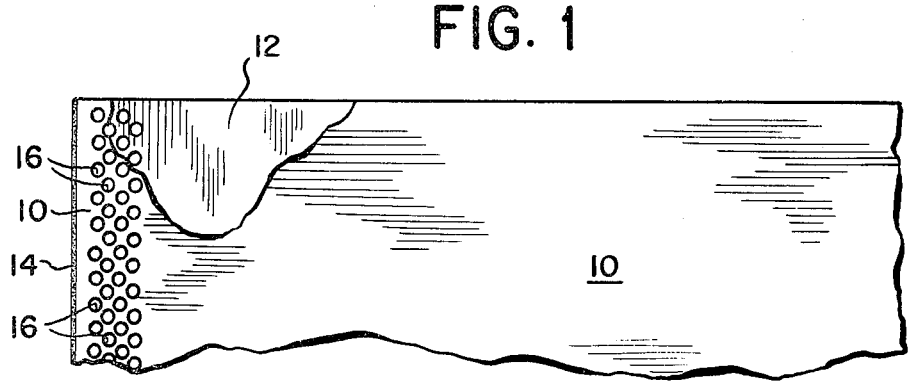
FIG. 1 is a fragmentary plan view of a pair of metal sheets illustrating the spatial pattern of the perforations therein.
Figure 5:
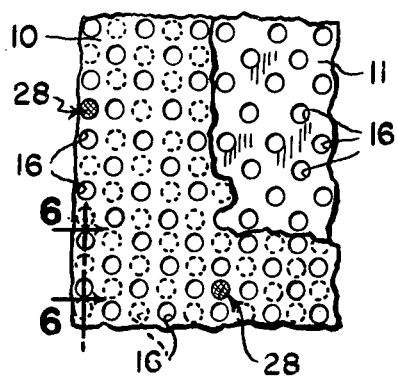
FIG. 5 is a plan view of the sheets of FIG. 1 showing the perforations out of registry.

The filtering septum according to the preferred embodiment illustrated in the drawings is fabricated from sheets such as 10 and 11 shown in superposed relation in FIG. 5. The sheets are preferably tempered light-gauge stainless steel having a thickness of approximately 0.008 inch. The sheets are each temporarily secured to another sheet 12 in any convenient manner to assure the same spatial pattern of perforations in each. FIG. 1 diagrammatically illustrates sheets 10 and 12, temporarily secured along a common edge 14, in the midst of a punching operation that produces an array of perforations 16 in sheet 10.

Figure 2:
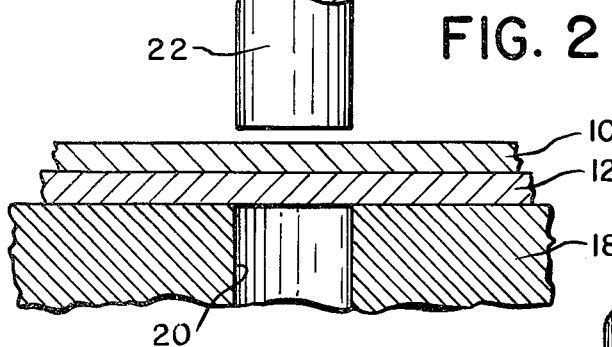
FIG. 2 is a greatly enlarged fragmentary section showing a first sheet and an unperforated bottom sheet prior to a punching operation.
Figure 3:
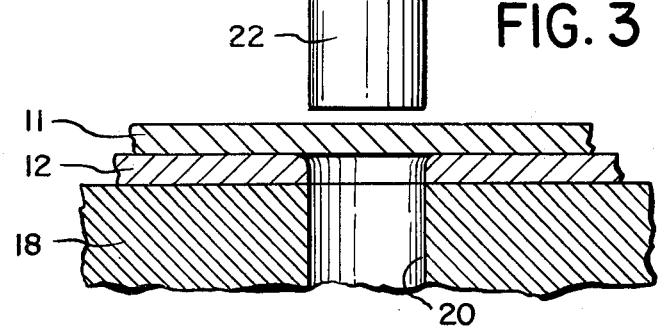
FIG. 3 is a view similar to FIG. 2 showing a previously perforated bottom sheet being reused.

The punching operation for a single pair of perforations is illustrated in fragmentary enlarged sectional views in FIGS. 2 and 3. In FIG. 2 there is shown a first or upper metal sheet 10 superposed over a bottom sheet 12 placed on a press bed 18 which is provided with a plurality of apertures 20, one of which is shown. The aperture 20 has an inner diameter that accommodates a complementary punch 22 during its punching stroke.

An intermediate stage of the punching operation showing the downward stroke of punch 22 is illustrated in FIG. 3. During the downward stroke of punch 22, the upper metal sheet 10 as well as the bottom sheet are sheared forming a perforation 16 in each whose size is determined by the size of punch 22. Both metal sheets 10 and 12 are quite ductile which results in a formation of a burr 24 about the periphery of the perforation 16 in the upper metal sheet 10 in the direction of the advancing punch. The burrs 24 in the upper sheet 10 are formed on the downward or inner face thereof and remain in that direction even though the punch 22 is retracted through the perforation.

In accordance with the teachings of the present invention, the bottom sheet is not used as part of the finished product but serves rather to permit the formation of burrs about each perforation of each new upper sheet during the punching process.

This punching operation for each sheet is done in stages across the sheet until the desired array of perforations has been accomplished. Typically, the punching operation may proceed by punching the sheets 10 and 12 simultaneously in a plurality of locations defining two adjacent rows of perforations and then advancing the secured sheets a small distance in anticipation of punching the subsequent adjacent two rows. Of course, more than two rows of perforations may be accomplished in a single step.

Figure 4:
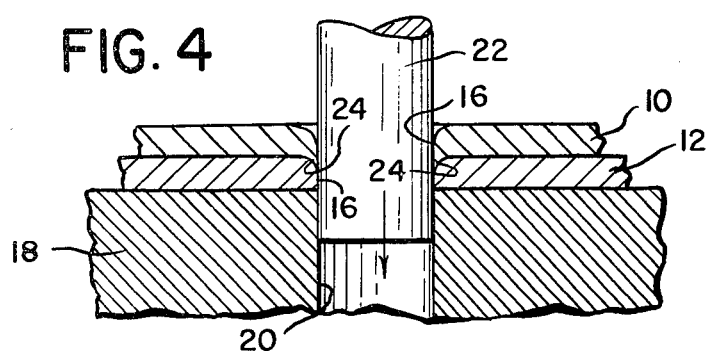
FIG. 4 is a view similar to FIGS. 2 and 3 showing the sheets perforated during the punching stroke.
Figure 7:
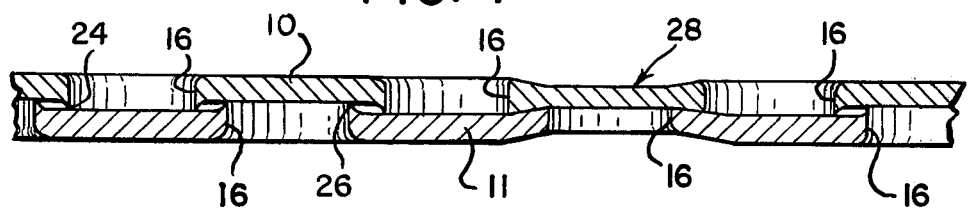
FIG. 7 is a section similar to FIG. 5 on a slightly enlarged scale, showing one of the spot welds employed for securing the sheets in a predetermined relationship.

After the punching process is completed, the two metal sheets 10 and 12 are separated. Then, as shown in FIG. 4, the above steps are repeated with a second metal sheet 11 of comparable dimensions to the first metal sheet 10 substituted therefor and the same bottom sheet 12 is reused, unless it has become worn. Typically, a bottom sheet 12 may be used fifty times. After the second sheet 11 is perforated with burrs 26 formed on the inner face thereof, the two sheets 10 and 11 are arranged in inner-face-to-inner-face relationship. The two sheets are preferably tempered stainless steel to insure the duplication of the spatial pattern of performations in each to permit the perforations of one to be completely out of registry with the perforations of the other as illustrated in FIG. 5. In this manner the burrs of either sheet bear against unperforated areas of the other sheet. In this relationship, the two sheets may be permanently secured by any suitable means such as spot welds 28 which may be applied at random locations one of which is shown on an enlarged scale in FIG. 7.

When the punch 22 is newly sharpened, the length of the burrs formed about each perforation is approximately 0.004 inch. Due to the numerous perforations punched, each punch 22 regularly becomes dulled and must be periodically sharpened. As the punch 22 becomes dull, the burrs eventually become longer. When the burrs attain a length of 0.007 inch, the punch 22 is resharpened. The filter septum will function adequately with the length of the burrs in the 0.004 and 0.007 inch range provided that the burrs of each of the pair of metal sheets of a filter septum are of comparable length.

Figure 6:
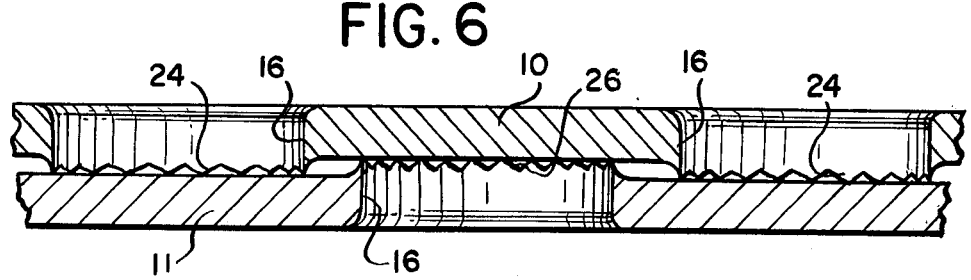
FIG. 6 is a greatly enlarged section taken along lines 6—6 of FIG. 5.

A fragmentary section of first and second sheets 10 and 11 in contacting inner-face-to-inner-face relationship is shown in FIG. 6. FIG. 6 illustrates the burrs 24 and 26 bearing against unperforated areas of the opposed sheet along lines of imperfect contact. This "double-edge" filtering septum described herein may be cut to any desired shape or size, depending on the filter in which it is to be installed.

The filtrate enters the perforations in one of the metal sheets and must pass laterally or edgewise past the burrs and the unperforated area of the adjacent other metal sheet. Unlike in the prior art, the liquid must pass by a second set of burrs before it can exit the filter septum. The additional set of burrs allows this filtering septum to increase its ability to retain the filtering medium without reducing the size of the perforations. For example, the filtering septum has a retention value of 140 microns for perforations of approximately 0.046 inch diameter. The inventive filtering septum provides a greater pressure differential and avoids the previously discussed "channeling" problem since the liquid is forced to "spread out" more uniformly throughout the vessel. This results in a more uniform flow distribution and greater efficiency in the utilization of the filtering medium.

We claim:

1. In a filtering septum of the type having a single pair of metal sheets in superposed contacting relation, each sheet having a multiplicity of perforations therein, the perforations in each of said sheets being of like generally uniform diameter and arranged in the same spatial pattern, said pattern being such that adjacent each perforation there is an unperforated area larger than said perforation, said superposed sheets arranged in a relationship in which the perforations of one sheet are completely out of registry with those of the other sheet, the improvement wherein both of said metal sheets comprise:

marginal burrs on the inner face of each of said sheets defined by said perforations such that when said two sheets are secured in inner-face-to-inner-face relationship, the burrs of each of said sheets bear against unperforated areas of the other sheet along lines of imperfect contact pervious to a restricted flow of liquid.

2. A filtering septum according to claim 1 wherein: the length of the burrs of one of said pair of sheets is generally equivalent to the length of the burrs of said other metal sheet.

3. A filtering septum according to claim 2 wherein: each of said metal sheets is tempered stainless steel.

4. A filtering septum according to claim 3 wherein: each of said stainless steel sheets are of approximately the same thickness which is less than 0.01 inch.

5. A filtering septum according to claim 4 wherein:
(a) said stainless steel sheets are approximately 0.008 inch thick; and
(b) the length of the burrs of each of said sheets is generally in the range of 0.004 inch and 0.007 inch.

* * * * *